United States Patent
Lappeteläinen et al.

(10) Patent No.: US 6,842,605 B1
(45) Date of Patent: Jan. 11, 2005

(54) ASSEMBLY, AND ASSOCIATED METHOD, FOR FACILITATING CONTROL OVER POWER LEVELS OF COMMUNICATION SIGNALS IN A RADIO COMMUNICATION SYSTEM

(75) Inventors: Antti Lappeteläinen, Espoo (FI); Visa Smolander, Espoo (FI); Juha Salokannel, Kangasala (FI); Mika Kasslin, Vantaa (FI)

(73) Assignee: Nokia Corporation, Espoo (FI)

( * ) Notice: Subject to any disclaimer, the term of this patent is extended or adjusted under 35 U.S.C. 154(b) by 165 days.

(21) Appl. No.: 09/613,952

(22) Filed: Jul. 11, 2000

(51) Int. Cl.[7] .............................. H04B 7/185
(52) U.S. Cl. .................. 455/13.4; 455/522; 455/69; 370/318
(58) Field of Search ................ 455/13.4, 522, 455/69; 370/318

(56) References Cited

U.S. PATENT DOCUMENTS

| | | | | |
|---|---|---|---|---|
| 5,241,690 A | * | 8/1993 | Larsson et al. ............. 375/345 |
| 5,564,075 A | * | 10/1996 | Gourgue ..................... 455/127 |
| 5,852,782 A | * | 12/1998 | Komatsu ..................... 455/522 |
| 5,893,036 A | | 4/1999 | Trandai et al. .............. 455/522 |
| 5,995,496 A | * | 11/1999 | Honkasalo et al. ......... 370/318 |
| 6,014,087 A | * | 1/2000 | Krishnakumar et al. . 340/825.5 |
| 6,067,291 A | * | 5/2000 | Kamerman et al. ......... 370/338 |
| 6,370,109 B1 | * | 4/2002 | Schwartz et al. ........... 370/203 |
| 6,408,165 B1 | * | 6/2002 | Raissinia et al. ........... 455/522 |

FOREIGN PATENT DOCUMENTS

| | | |
|---|---|---|
| EP | 0 910 176 A2 | 4/1999 |
| WO | WO 99 16214 | 4/1999 |
| WO | WO 00 25443 | 5/2000 |

* cited by examiner

*Primary Examiner*—William Trost
*Assistant Examiner*—Stephen M. D'Agosta

(57) ABSTRACT

An assembly, and an associated method, for facilitating effectuation of a transmission power control scheme in a radio communication system, such as that defined in the IEEE 802.11 standard. Separate power schemes are defined in point control function operation and distributed control function operation of the communication system. Signaling is provided between network infrastructure and mobile stations to instruct the mobile stations to generate communication signals of selected power levels.

10 Claims, 3 Drawing Sheets

ASSEMBLY, AND ASSOCIATED METHOD, FOR FACILITATING CONTROL OVER POWER LEVELS OF COMMUNICATION SIGNALS IN A RADIO COMMUNICATION SYSTEM

The present invention relates generally to communications in a multi-user communication system, such as a WLAN (Wireless Local Area Network) operable generally pursuant to the IEEE 802.11 standard. More particularly, the present invention relates to an assembly, and an associated method, by which to facilitate control over power levels at which communication signals are transmitted during operation of the communication system. In one implementation, a Transmission Power Control (TPC) scheme is provided for a communication system operable pursuant to the IEEE 802.11 standard.

BACKGROUND OF THE INVENTION

A communication system provides for the communication of information between a sending station and a receiving station by way of a communication channel. Information to be communicated by the sending station to the receiving station is converted into a form to permit its communication upon the communication channel. A wide variety of different types of communication systems have been developed and are regularly utilized to effectuate communication of information between sending and receiving stations.

New types of communication systems have been, and continue to be, developed and constructed as a result of advancements in communication technologies. A radio communication system is representative of a type of communication system which has benefited from advancements in communication technologies. Increased communication mobility is provided in a radio communication system as radio links are utilized to form communication channels upon which the information is communicated. In contrast, in a wireline communication system, wireline connections are required to form a communication link between sending and receiving stations.

The communication capacity of a radio communication system, however, is sometimes constricted by bandwidth limitations. Only a limited amount of the electromagnetic spectrum is allocated to be used by a particular radio communication system. In other words, when the communication capacity is limited by the bandwidth allocated to the radio communication system, an increase in communication capacity requires more efficient utilization of the available bandwidth.

Digital communication techniques, for instance, can be used in a manner by which to increase the bandwidth efficiency of communications upon a communication channel in a communication system. Due to the particular need to efficiently utilize the bandwidth allocated in the radio communication system; the use of such digital techniques is particularly advantageously utilized in a radio communication system.

Digital communication techniques typically involve digitizing information, i.e., data, which is to be communicated into digital form to form digital bits. The digitized bits are sometimes formatted to form packets of digital bits. Packets of data are communicated in a packet data system at discrete intervals and, subsequent to reception at a receiving station, connected theretogether to recreate the informational content of the data.

Because packets of data can be communicated at discrete intervals, a frequency band need not be dedicated solely for the communication of data generated by one sending station for transmission to one receiving station, as conventionally required in analog communications. Instead, the frequency band can be shared amongst a plurality of different sending and receiving station pairs. Because the same frequency band can be utilized to effectuate communications by the plurality of pairs of communication stations, improved communication capacity is possible.

Conventional LANs communicate packets of data to effectuate communications therein. Wireless networks, operable in manners analogous to LANs, referred to as WLANs (Wireless Local Area Networks) have also been developed and are utilized to communicate data over a radio link.

The standards of operation of an exemplary WLAN are set forth in the IEEE (Institute of Electrical and Electronic Engineers) 802.11 specification. The standard set forth in the specification provides for multi-user communications. Data is formatted into packets and sent over a radio link.

As presently promulgated, the IEEE 802.11 specification defines a Contention Period (CP) and Contention Free Period (CFP). The contention period defines a random access period during which any sending station is permitted random access to communicate data. And, the contention free period defines a period in which data is permitted to be communicated responsive to a polling procedure n which allocations are made as to when a sending station is permitted to communicate a frame of data.

Point Coordinate Function (PCF) and Distributed Coordination Function (DCF) procedures are also defined. These functions are access methods defined in the IEEE 802.11 standard. DCF, a mandatory function defines the CP, and PCF, an optional function, defines the CFP.

Proposals have been set forth by which to adopt the IEEE 802.11 WLAN standard as a European WLAN standard. However, IEEE 802.11 standard, as presently promulgated, fails to include a Transmission Power Control (TPC) scheme. A transmission power control scheme is required to be implemented in a WLAN system in Europe.

If a manner could be provided by which to provide a transmission power control scheme to a WLAN system constructed otherwise according to the IEEE 802.11 standard, the resultant system could be adopted as a European WLAN standard.

It is in light of this background information related to radio communication systems that the significant improvements of the present invention have evolved.

SUMMARY OF THE INVENTION

The present invention, accordingly, advantageously provides an assembly, and an associated method, by which to communicate in a multi-user radio communication system, such as a WLAN (Wireless Local Area Network) generally operable pursuant to the IEEE (Institute of Electrical and Electronic Engineers) 802.11 standard. Specifically, operation of an embodiment of the present invention provides a manner by which to facilitate effectuation of power control of signals transmitted during operation of the communication system.

The transmission power control scheme of the present invention facilitates quality of communications of the communication system in which the scheme is implemented. The transmission power control scheme is provided in a manner defining new messages but without requiring the use of new frames. Rather, the transmission power control scheme is preferably provided merely by redefining fields of existing frames.

In one aspect of the present invention, a transmit power indication signal is generated at the network infrastructure of the radio communication system in which an embodiment of the present invention is operable. The transmit power indication signal is broadcast to all mobile stations within the coverage area encompassed by the sending station forming a portion of the network infrastructure at which the signal is generated. Mobile stations are tunable to detect the transmit power indication signal and are thereby provided with an indication of the maximum power levels at which communication signals generated at the respective mobile stations are to be transmitted upon random access channels.

When communications are to be effectuated upon allocated channels to individual mobile stations, the transmit power indication signal is again broadcast to the mobile stations. Additionally, a power control correction information signal is also transmitted to individual ones of the mobile stations. The power levels indicated by the transmit power indication signal is offset, at the individual mobile stations, by the value of the power control correction information signal. The resultant value is the transmit power at which the mobile station is to transmit communication signals upon the channels allocated thereto. Thereby, the power level at which communication signals are transmitted by a mobile station is alterable from a standard transmit power level.

In one implementation, a transmit power control scheme is provided for a radio communication system generally operable pursuant to the IEEE 802.11 standard. In the IEEE 802.11 standard, communications between mobile stations and the network infrastructure of the WLAN are effectuated either by way of allocated channels or by way of random access channels. Communications are divided into contention periods and contention free periods. During a contention period, random access is permitted of a mobile station to communicate with the network infrastructure. And, during a contention free period, channels are allocated for communications between a mobile station and the network infrastructure. Beacon periods are defined during both the contention and contention free period. Access points forming portions of the network infrastructure broadcast transmit power indication signals during the beacon periods to all of the mobile stations operable in the WLAN and within the coverage area of the respective access points.

Mobile stations detect the transmit power indication signal and, when operating in the contention period, generate communication signals of values responsive to values of the transmit power indication signal. The access points are further selectably operable to generate power control correction information signals to individual ones of the mobile stations. Values of the power control correction information signals are utilized by the mobile stations; when communication signals are to be generated during the contention free period, to offset the power levels indicated by the transmit power indication signals. Thereby, the transmit power of the signals generated by a mobile station during the contention free period is tailored to the individual requirements of the mobile station-access point pair.

In these and other aspects, therefore, an assembly, and an associated method, is provided for a multi-user radio communication system. The muti-user radio communication system includes a network infrastructure with which mobile stations communicate data. The data forms portions of communication signals transmitted at selected power levels. Selection of the power levels at which to transmit the communication signals is facilitated. A signal generator is coupled to the network infrastructure. The signal generator generates a transmit power indication signal for transmission to at least one of the mobile stations. The transmit power indication signal is of a value representative of a maximum allowable power level at which to transmit the communication signals.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
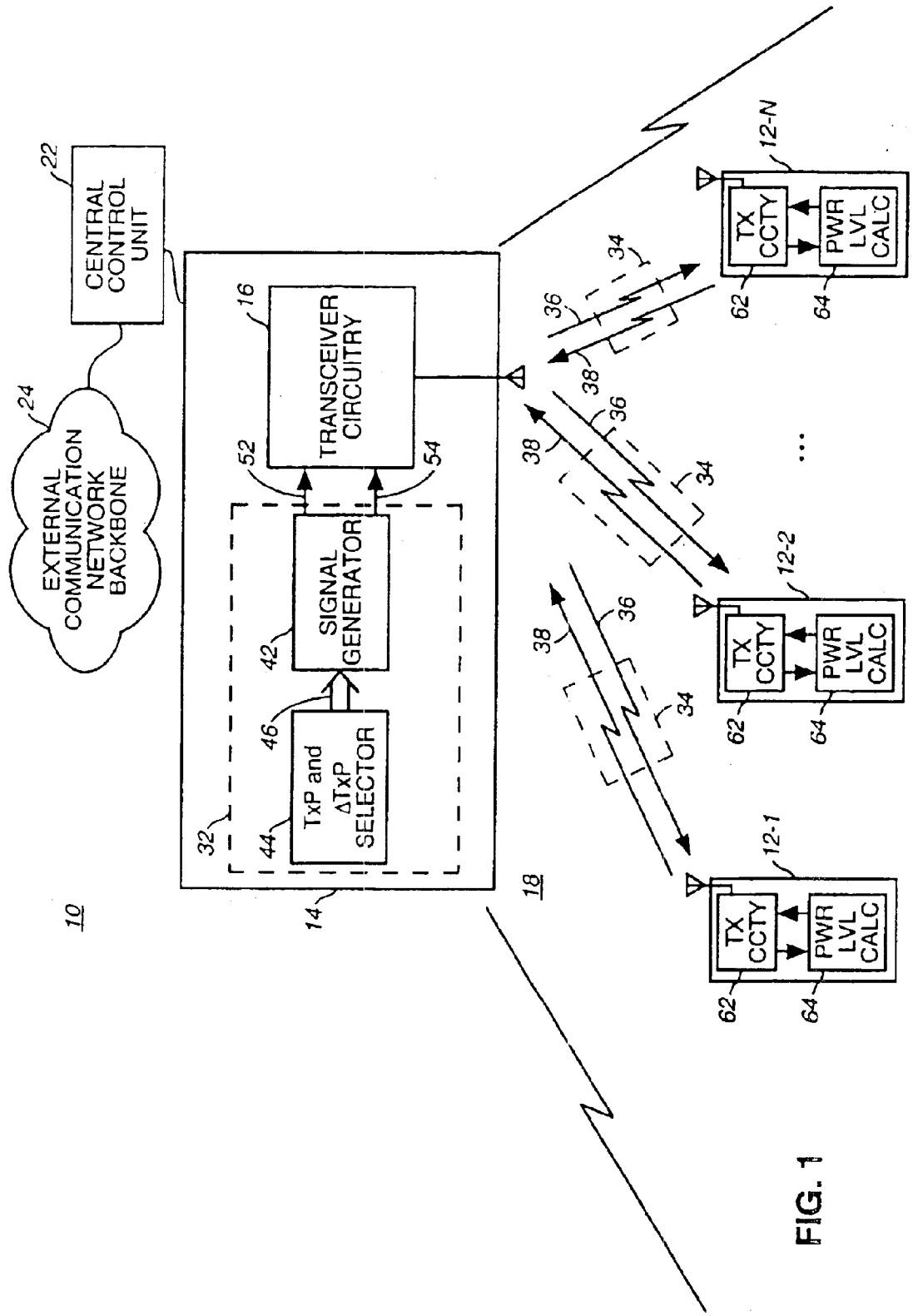
FIG. 1 illustrates a functional block diagram of a radio communication system in which an embodiment of the present invention is operable.

Referring first to FIG. 1, a communication system, shown generally at 10, provides for radio communications with a plurality of mobile stations 12, here identified by 12-1 through 12-N. The communication system is a multi-user communication system permitting at least seemingly-concurrent communication with a plurality of the mobile stations 12-1 through 12-N.

In the exemplary implementation, the communication system 10 forms a WLAN (Wireless Local Area Network) operable generally pursuant to the standards set forth in the IEEE (Institute of Electrical and Electronic Engineers) 802.11 standard. As defined in such specification, multi-user communications are provided with the mobile stations 12. Other types of radio communication systems can similarly be illustrated. While the following description shall describe operation of an embodiment of the present invention with respect to the exemplary communication system forming a WLAN system operable to the 802.11 standard, in other implementations, embodiments of the present invention can analogously be implemented in other types of radio communication systems.

A single access point 14 is shown in the figure. In an actual WLAN system, a plurality of access points are typically utilized, positioned at spaced-apart locations, each defining a coverage area within which communications with mobile stations 12 are permitted.

The access point 14 is here shown to include radio transceiver circuitry 16. The radio transceiver circuitry is capable of transceiving radio communication signals with mobile station which are positioned within the coverage area defined by the access point. A coverage area 18, sometimes also referred to as a cell, is associated with the access point 14 shown in the figure. The mobile stations 12-1 through 12-N are positioned within the coverage area 18. Due to the mobility inherent of mobile stations, the number of mobile stations positioned within the coverage area 18 at any particular time is variable.

The access point 14 is coupled to a Central Control Unit (CCU) 22. Other access points, not shown in the figure, are similarly also coupled to the central control unit. The central control unit is operable, amongst other things, to perform control functions to control various aspects of operation of the WLAN of which the communication system 10 is formed. Here, the central control unit is further shown to be coupled to an external communication network backbone 24. Other communication stations (not shown in the figure) are connectable to the network backbone 24.

A mobile station is able to communicate, by way of an access point 14, both with other mobile stations and also, by way of the central control unit and external communication network backbone, with a communication station connected to the backbone. Because of the multi-user nature of the WLAN system, a plurality of seemingly-concurrent communications can be effectuated between a plurality of mobile stations 12 and a plurality of other communication stations.

The access point 14 also includes control apparatus 32 operable pursuant to an embodiment of the present invention. The control apparatus 32 is operable, amongst other things, to select the power levels at which communication signals are transmitted between the mobile stations 12 and the access point 14. Communications are effectuated between the access point 14 and each mobile station by way of radio links 34. The radio links 34 include both forward and reverse links 36 and 38, respectively. Signals generated by the access point 14 are transmitted to respective ones of the mobile stations by way of a forward link 36. Certain other signals are broadcast by the access points to all the mobile stations, also by way of the forward links 36. Signals generated by respective ones of the mobile stations are transmitted to the access point 14 by way of respective ones of the reverse links 38.

The control apparatus 32 is here shown to include a signal generator 42 coupled to a transmit power and change in transmit power selector 44 by way of the lines 46. The selector 44 is operable to generate indications on the line 46 of the power levels at which communication signals are to be transmitted during operation of the WLAN system 10. Values of the selected transmit power levels are either determined at the selector 44 or otherwise provided thereto. The selector is further operable to generate indications of changes in the transmit power levels at which selected communication signals are to be transmitted. Analogously, changes in the transmit power levels are either determined at the selector 44 or otherwise provided thereto.

The signal generator 42 is selectably operable responsive to values provided thereto, to generate a transmit power indication signal on the line 52 for application to a transmit portion of the transceiver circuitry 16. The transmit power indication signals are broadcast to the mobile stations 12-1 through 12-N during selected intervals. In the exemplary implementation, the transmit power indication signal forms a portion of the beacon signal broadcast at periodic, or other selected, intervals. Thereby, each mobile station is provided with an indication of the transmit power at which communication signals generated at the respective mobile stations are to be generated. When the communication signals originated at the mobile stations are to be generated during a contention period, the communication signals are caused to be of power levels substantially corresponding to the transmit power levels indicated by the transmit power indication signal.

The signal generator is also selectably operable to generate a power control correction information signal on the line 54, also for application to the transmit portion of the transceiver circuitry 16. The power control correction information signal is of value representative of changes to the transmit power level at which individual mobile stations should transmit communication signals when operating in a contention free period. Indications of such signal are selectably transmitted by the transmit portion of the transceiver circuitry 16 to the appropriate mobile stations. Thereby, individual ones of the mobile stations are provided with indications of changes to a nominal transmit power level at which communication signals are to be transmitted by such mobile stations during a contention free period.

Each of the mobile stations 12-1 through 12-N includes transceiver circuitry 62 operable to transceive communication signals with an appropriate access point 14. Each of the mobile stations further includes a power level calculator 64. The power level calculator is coupled to the associated transceiver circuitry 62. In the exemplary implementation, the power level calculator forms a portion of control circuitry of the mobile station and is, for instance, an algorithm executable by a control processor which forms a portion of the control circuitry. The power level calculator is coupled to the transceiver circuitry to receive the values representative of values of the transmit power indication signal and the power control correction information signal broadcast, or transmitted, to the mobile station. Responsive to the values of such signals, the power level calculator is operable to calculate power levels at which the mobile station is to transmit subsequent communication signals through the access point 14. When the mobile station is operated pursuant to a distributed control function period during the contention period upon random access channels, the power level calculator calculates the power level of subsequently generated communication signals to correspond to the power level indicated by the transmit power indication signal. And, when the mobile station is operated pursuant to a Point Coordination Function (PCF) during a contention free period, the power level calculator calculates the power levels at which subsequently generated communication signals are to be transmitted to correspond to the values of the transmit power indication signal offset by values of the power control correction information signal. That is to say, the power level calculated by the calculator 64 when the mobile station is operated pursuant to a point control function during the contention free period sums together the value of the transmit power indication signal together with the value of the power control correction information signal. As the power control correction information signal is of a negative value, the power level calculated by the calculator is less than the value of the transmit power indication signal. Thereby, the power level of the subsequently generated communication signals by the mobile station is reduced to a level, appropriate to effectuate communications on an allocated channel but less likely to cause interference of concurrently generated signals.

Figure 2:
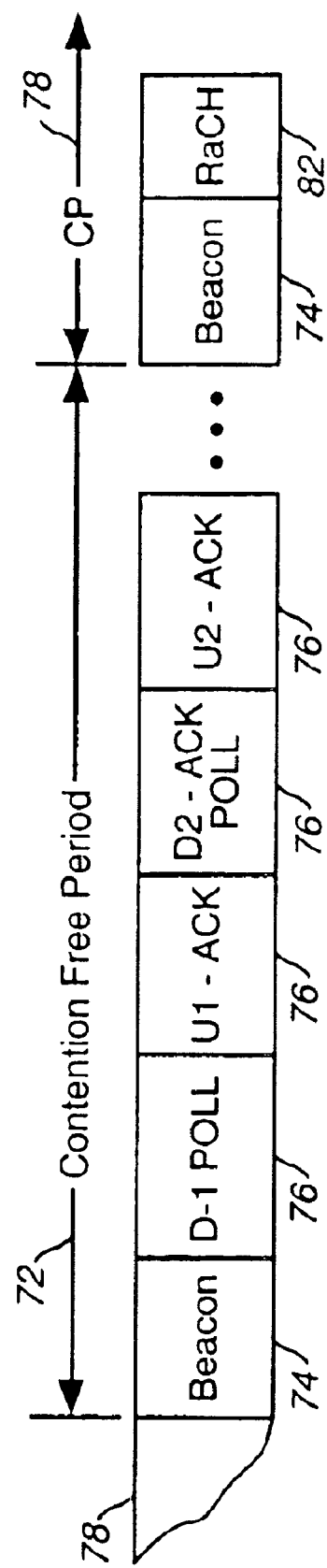
FIG. 2 illustrates a representation of portions of a single contention period and contention free period defined pursuant to operation of the exemplary radio communication system shown in FIG. 1.

FIG. 2 illustrates portions of a Contention Free Period (CFP) and a Contention Period (CP) defined in the IEEE 802.11 specification. As set forth in the specification, the contention free period, here shown at 72, is defined to be a period during which random access of communications between mobile stations 12 and the access point 14 is not permitted. Rather, during the contention free period, the access point 14 determines which mobile stations are permitted to transmit data. A Point Coordinator (PC) is implemented at the access point to perform functions of a polling master to make the determinations of channel allocations to individual ones of the mobile stations.

The contention free period 72 is here shown to include a beacon portion 74 and a plurality of data portions 76. The beacon portion is repeated at periodic intervals during the contention free period. In the figure, the designation D indicates a downlink transmission upon a forward link 36, and a reverse link transmission is identified by U on a reverse link channel 38. And, the designation POLL is used to indicate polling of a mobile station, and the designation ACK is utilized to indicate an acknowledgment of the transmission.

The contention free period 72 is bordered by contention periods 78. Beacon periods also include beacon portions 74 as well as a plurality of random access channels 82 upon which the mobile stations contend for access. As set forth in the IEEE 802.11 specification, the random access channel scheme is operable pursuant to a Distributed Coordination Function (DCF).

During operation of an embodiment of the present invention, the transmit power indication signal is transmitted during the beacon portions 74. And, in the exemplary implementation, the transmit power information signal is transmitted as a field within the beacon frame body of the beacon portion. In the exemplary implementation, the power control correction information signal is transmitted as part of the duration/ID field defined in the 802.11 standard. Mobile stations tuning to receive the beacon generated during the beacon period 74 thereby detect the values of the signals.

Figure 3:
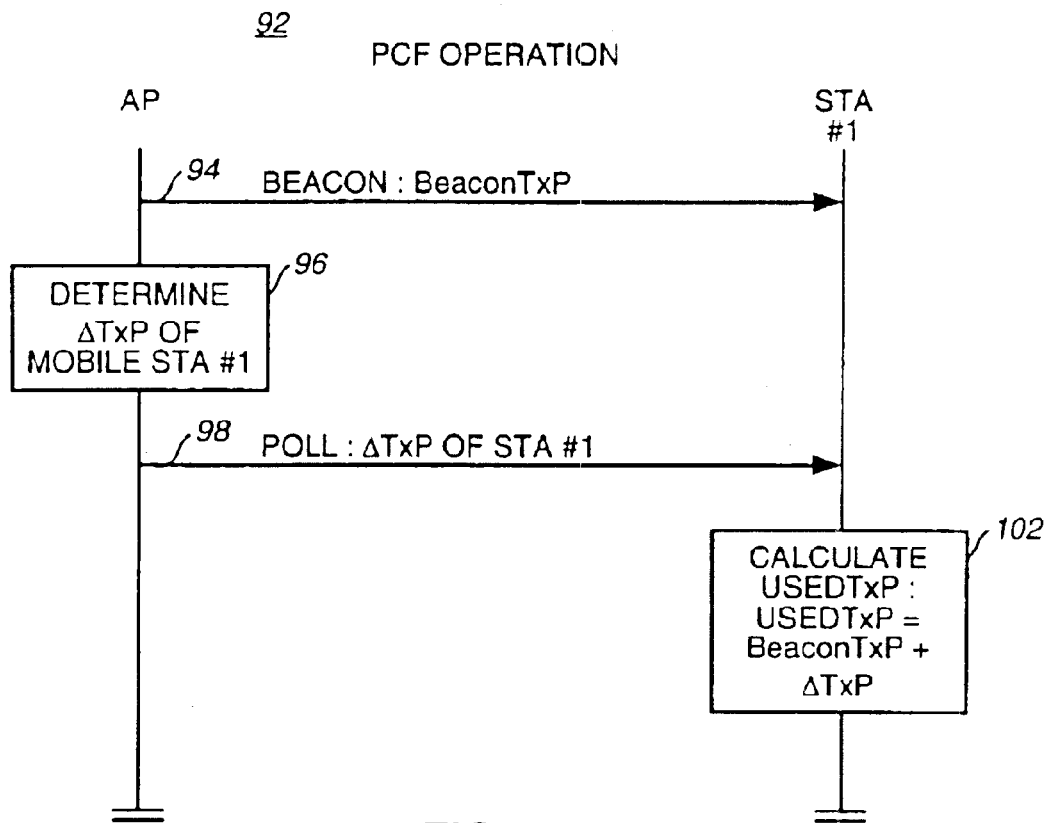
FIG. 3 illustrates a message sequence diagram representative of signaling generated during operation of an embodiment of the present invention.

FIG. 3 illustrates a message sequence diagram, shown generally at 92, illustrating signaling generated during point coordination function operation of an embodiment of the present invention during a contention free period. First, and as indicated by the segment 94, a transmit power indication signal is transmitted by the access point 14 to the mobile stations 12. And, as indicated by the block 96, a determination is made of the value of the power control correction information signal at the access point. Such a determination is made, for instance, responsive to information previously provided to the access point by the appropriate mobile station. Then, and as indicated by the segment 98, a power control correction information signal is transmitted by the access point 14 to the mobile station. Then, and as indicated by the block 102, calculations made at the mobile station at a power level, used TxP, at which communication signals generated at the mobile station are to be transmitted.

Figure 4:
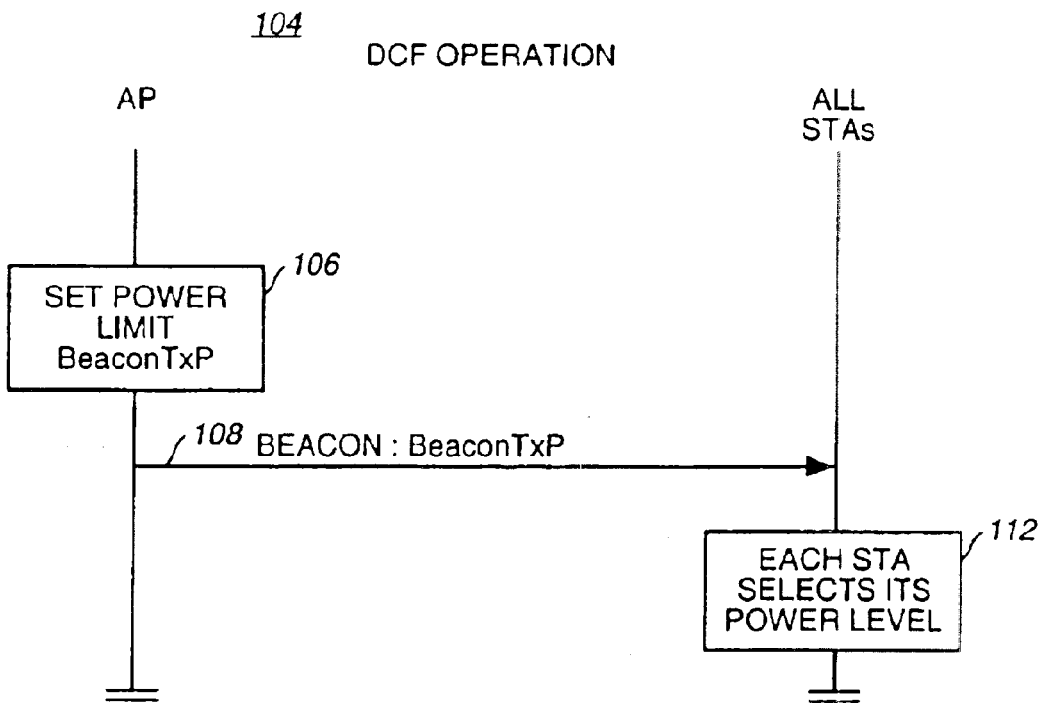
FIG. 4 illustrates another message sequence diagram also representative of signaling generated during operation of an embodiment of the present invention.

FIG. 4 illustrates another message sequence diagram, here shown generally at 104, representative of signaling generated during distributed control function operation of an embodiment of the present invention during a contention period. Here, as indicated by the block 106, selection is made at the access point of the value of the transmit power indication signal. Then, and as indicated by the segment 108, the transmit power indication signal is transmitted by the access point to all of the mobile stations within the coverage area defined by the access point. Then, and as indicated by the block 112, each of the mobile stations selects the power level at which subsequently-generated communication signals transmitted during a contention period are to be communicated.

The previous descriptions are of preferred examples for implementing the invention, and the scope of the invention should not necessarily limited by this description. The scope of the present invention is defined by the following claims.

We claim:

1. An assembly for a radio communication system having a network infrastructure for communicating data with a plurality of mobile stations, the data forming portions of communication signals transmitted at selected power levels, said assembly for facilitating selection of the power levels at which mobile stations are to transmit the communication signals, said assembly comprising:

a signal generator coupled to the network infrastructure for generating, during selected intervals, a transmit power indication signal for broadcast transmission to the plurality of mobile stations, the transmit power indication signal indicating a maximum allowable power level at which each of the plurality of mobile stations are to transmit the communication signals, and for generating a power correction information signal for transmission to a selected at least one of the plurality of mobile stations, the power correction information signal for use by the mobile station in selecting a power level at which to transmit the communication signals a mobile-station power-level calculator positioned at the selected at least one of the plurality of mobile stations, said mobile-station power-level calculator operable, responsive to the value of the transmit power indication signal and to the value of the power correction information signal, to calculate a power-level at which communication signals are to be transmitted by the selected at least one mobile station wherein the radio communication system defines beacon intervals within which beacon signals are broadcast by the network infrastructure, and wherein the transmit power indication signal is generated for broadcast as part of at least one beacon signal;

wherein the radio communication system defines polling periods during which the network infrastructure polls a selected one of the plurality of mobile stations; and wherein the power correction information signal is transmitted to the selected at least one of the mobile stations when the network infrastructure polls the selected at least one of the mobile stations.

2. An assembly for a radio communication system having a network infrastructure for communicating data with a plurality of mobile stations, the data forming portions of communication signals transmitted at selected power levels, said assembly for facilitating selection of the power levels at which mobile stations are to transmit the communication signals, said assembly comprising:

a signal generator coupled to the network infrastructure for generating, during selected intervals, a transmit power indication signal for broadcast transmission to the plurality of mobile stations, the transmit power indication signal indicating a maximum allowable power level at which each of the plurality of mobile stations are to transmit the communication signals, wherein each of the plurality of mobile stations transmit communication signals at power levels substantially corresponding to the maximum allowable power level indicated by the value of the transmit power indication signal;

wherein the radio communication system defines beacon intervals within which beacon signals are broadcast by the network infrastructure, and wherein the transmit power indication signal is generated for broadcast as part of at least one beacon signal; and wherein the radio communication system defines a contention period including a plurality of sub-periods; and wherein the transmit power indication signal is generated during at least one of the plurality of definable sub-periods and broadcast to the plurality of mobile stations to control their transmission power during the contention period.

3. The assembly of claim 2, wherein the transmit power indication signal is broadcast as a field within a beacon-flame body of the at least one beacon signal.

4. In a radio communication system operable pursuant to a communication standard that defines a contention-free period and a contention period, the system having a network infrastructure for communicating data with a plurality of mobile stations, the data forming portions of communication signals transmitted at selected power levels, an improvement of an assembly for facilitating selection of the power levels at which mobile stations are to transmit the communication signals, said assembly comprising:

a signal generator coupled to the network infrastructure for generating, during selected intervals, a transmit power indication signal for broadcast transmission to the plurality of mobile stations, the transmit power indication signal indicating a maximum allowable power level at which each of the plurality of mobile stations are to transmit the communication signals;

wherein the transmit power indication signal is transmitted in a first manner during the contention-free period and in a second manner during the contention period, wherein the first manner by which the transmit power indication signal is transmitted comprises transmission to a selected one of the plurality of mobile stations; and wherein the radio communication system defines beacon intervals within which beacon signals are broadcast by the network infrastructure, and wherein the transmit power indication signal is generated for broadcast as part of at least one beacon signal.

5. A method for communicating in a radio communication system having a network infrastructure with which a plurality of mobile stations communicate data, the data transmitted at selected power levels, said method for facilitating power-level selection, said method comprising:

generating, during selected intervals, a transmit power indication signal indicating a maximum allowable power level at which each of the plurality of mobile stations are to transmit the communication signals; and broadcasting the transmit power indication signal, wherein the radio communication system defines beacon intervals within which beacon signals are broadcast by the network infrastructure, and wherein the transmit power indication signal is generated for broadcast as part of at least one beacon signal;

sending a power correction information signal to the selected one of the plurality of mobile stations; and selecting an operating power level at which communication signals are transmitted by the selected one of the plurality of mobile stations responsive to values of the power correction information signal and of the transmit power indication signal;

wherein the radio communication system defines a contention-free period and further comprising the operation of transmitting the transmit power indication signal to a selected one of plurality of mobile stations, during the contention-free period.

6. The method of claim 5 wherein the radio communication system defines a contention period and wherein said operation of broadcasting comprises broadcasting the transmit power indication signal during the contention period.

7. The method of claim 5, wherein the transmit power indication signal broadcast as part of the at least one beacon signal is broadcast as a field within a beacon-frame body of the at least one beacon signal.

8. Power-management apparatus for a radio communication system having a network infrastructure for wireless communication with a plurality of mobile stations, wherein the radio communication system defines a contention period and a contention-free period, and wherein the radio communication system defines beacon intervals within which beacon signals are broadcast by the network infrastructure, said power-management apparatus comprising:

a signal generator coupled to the network infrastructure, said signal generator for generating during respective selected intervals a transmit power indication signal and a power-correction information signal for transmission to at least a selected one of the plurality of mobile stations, the transmit power indication signal broadcast as a field within a beacon-frame body of the beacon signals;

wherein the power-correction information signal has a value that varies as a function of whether the power management occurs during a contention period or a contention-free period.

9. An assembly for a radio communication system having a network infrastructure with which a plurality of mobile stations communicate data at selected power levels, the radio communication system defining beacon intervals within which beacon signals are broadcast by the network infrastructure, said assembly for facilitating selection of the data-communication power levels, said assembly comprising:

a signal generator coupled to the network infrastructure, said signal generator for generating, during selected intervals, a transmit power indication signal for broadcast transmission to the plurality of mobile stations as part of the beacon signals, the transmit power indication signal having a value indicating a maximum-allowable power level at which the plurality of mobile stations are to transmit the data;

a mobile-station power-level calculator positioned at least a selected one of the plurality of mobile stations, said mobile-station power-level calculator operable responsive to the value of the transmit power indication signal and to the value of a power correction information signal to calculate a power-level at which communication signals are to be generated by the selected mobile station;

wherein the radio communication system further defines a contention-free period comprising a plurality of definable sub-periods, and wherein the transmit power indication signal generated by said signal generator is generated during at least one of the plurality of the definable sub-periods and transmitted to the selected one of the plurality of mobile stations; and wherein the radio communication system further defines polling periods during which the network infrastructure polls the selected one of the plurality of mobile stations and wherein the power correction information signal is transmitted to the selected one of the plurality of mobile stations when the network infrastructure polls the selected mobile station.

10. An assembly for a radio communication system having a network infrastructure with which a plurality of mobile stations communicate data at selected power levels, the radio communication system defining beacon intervals within which beacon signals are broadcast by the network infrastructure, said assembly for facilitating selection of the data-communication power levels, said assembly comprising:

a signal generator coupled to the network infrastructure, said signal generator for generating, during selected intervals, a transmit power indication signal for broadcast transmission to the plurality of mobile stations as part of the beacon signals, the transmit power indication signal having a value indicating a maximum-allowable power level at which the plurality of mobile stations are to transmit the data;

wherein the radio communication system further defines a contention-free period comprising a plurality of definable sub-periods, and wherein the transmit power indication signal generated by said signal generator is generated during at least one of the plurality of the definable sub-periods and transmitted to a selected one of the plurality of mobile stations; and wherein the radio communication system further defines polling periods during which the network infrastructure polls the selected one of the plurality of mobile stations and wherein a power correction information signal is transmitted to a selected one of the plurality of mobile stations when the network infrastructure polls the selected one of the plurality of mobile stations.

* * * * *